United States Patent [19]

Walsworth et al.

[11] Patent Number: 5,521,959

[45] Date of Patent: May 28, 1996

[54] PROGRAMMABLE SOURCE FOR SUPPLYING CONTROLLABLY VARIABLE AC/DC VOLTAGE OUTPUT FOR TELEPHONE LINE MEASUREMENT APPARATUS

[75] Inventors: Richard L. Walsworth, Westlake Village, Calif.; Alex Knight, Danville, Ind.; Joseph Barron, Newbury Park, Calif.

[73] Assignee: Harris Corporation, Melbourne, Fla.

[21] Appl. No.: 193,812

[22] Filed: Feb. 9, 1994

[51] Int. Cl.[6] .......................... H04M 1/24; H04M 3/08; H04M 3/22
[52] U.S. Cl. .......................... 379/27; 379/1; 379/5; 379/10; 379/22; 379/24; 379/29; 379/30
[58] Field of Search .................. 379/1, 5, 10, 24, 379/22, 27, 29, 30, 413

[56] References Cited

U.S. PATENT DOCUMENTS

| | | | |
|---|---|---|---|
| 4,001,559 | 1/1977 | Osborne | 379/22 |
| 4,611,101 | 9/1986 | Walter | 379/24 |
| 4,634,813 | 1/1987 | Hensley | 379/24 |
| 4,794,632 | 12/1988 | Burton | 379/22 |
| 4,825,458 | 4/1989 | Dash | 379/1 |
| 4,860,332 | 8/1989 | Chism | 379/1 |
| 4,991,196 | 2/1991 | Krebs | 379/30 |
| 4,995,070 | 2/1991 | Shin | 379/27 |
| 5,003,573 | 3/1991 | Agah | 379/27 |
| 5,018,184 | 5/1991 | Abrams | 379/29 |
| 5,056,131 | 10/1991 | Kanare | 379/27 |
| 5,062,131 | 10/1991 | Kanare et al. | 379/27 |
| 5,063,585 | 11/1991 | Shapiro | 379/27 |
| 5,195,124 | 3/1993 | Ishioka | 379/29 |

*Primary Examiner*—Stephen Chin
*Assistant Examiner*—Vijay Shankar
*Attorney, Agent, or Firm*—Charles E. Wands

[57] ABSTRACT

A microprocessor-controlled voltage source selectively provides to a telephone line either a DC or an AC voltage, prescribed characteristics of which are programmably adjustable, enabling test equipment to controllably condition and test the line with essentially any desired line conditioning voltage or signal waveform. A digital-to-analog converter (DAC) provides an output voltage having an amplitude that is digitally programmable. This output voltage is available to be applied either directly or through controlled amplifier circuitry to the line. In order to generate an AC signal having both an adjustable amplitude and waveform characteristic, the output of the DAC sets the amplitude for a combination of signals from a plurality of squarewave generators having programmable frequency characteristics. The output of the combining unit is coupled to a switched capacitor filter which filters the controllably-interrupted, digitally-controllable output voltage, (e.g., removes odd harmonics from the fundamental frequency of the desired waveform) and an adjustable smoothing filter, which is coupled to the switched capacitor filter and removes the 'stairstep' transitions in the waveform associated with the operation of the switched capacitor filter. The output of the smoothing filter is coupled to an output amplifier which amplifies the AC waveform output of the adjustable smoothing filter.

13 Claims, 4 Drawing Sheets

5,521,959

PROGRAMMABLE SOURCE FOR SUPPLYING CONTROLLABLY VARIABLE AC/DC VOLTAGE OUTPUT FOR TELEPHONE LINE MEASUREMENT APPARATUS

FIELD OF THE INVENTION

The present invention relates in general to telephone measuring and test equipment and is particularly directed to a microprocessor-controlled voltage source for selectively providing to a telephone line either a DC or an AC voltage, prescribed characteristics of which are programmably adjustable, thereby enabling the measuring and test equipment to controllably condition and test the line.

BACKGROUND OF THE INVENTION

Telephone line measuring and test equipment employed by telephone service providers customarily employs a variety of conditioning and signal generation components in order to enable service and maintenance personnel to apply a prescribed number of electrical stimuli to the line, for the purpose of trouble-shooting the line and measuring its performance. Among these various components are tone generation circuits and electrical conditioning sources that are used to selectively transmit prescribed test signals to the line (such as DTMF tones, a 577.5 Hz tracer tone, a 30 Hz line capacitance measurement sine wave) and to condition the line with a set of electrical circuit parameters (e.g., predetermined D.C. voltage levels) that allow a line monitoring unit to conduct line resistance and capacitance measurements and thereby determine the current state of the line and its ability to successfully perform as intended.

In the past, such stimuli have conventionally been sourced from multiple single-function circuits, which are selectively switched into or applied to the telephone line upon which measurements are to be conducted or for which throughput and performance are to be verified. Because the number and variety of measurements for which the test circuitry must be equipped is not insubstantial, the number of conditioning and signal source components that must be contained within the test circuitry results in a device that is both complex and costly.

SUMMARY OF THE INVENTION

In accordance with the present invention, in place of a hardware-intensive measurement and test unit that is composed of a large number of discrete signal generation and line conditioning components, we have developed a fully programmable microprocessor-controlled voltage source that is able to selectively supply to a telephone line either a DC or an AC voltage, prescribed characteristics of which are programmably adjustable, thereby enabling the measurement and test equipment to controllably condition and test the line with essentially any desired line conditioning voltage or signal waveform.

For this purpose the present invention employs a programmable digital-to-analog converter (DAC) which provides an output voltage having an amplitude that is digitally selectable under the control of a resident micro-controller. The output of the DAC is an adjustable-amplitude DC voltage which can be applied through controlled amplifier circuitry to the line.

In order to generate an AC signal having both an adjustable amplitude and waveform characteristic, the output of the DAC sets the peak-to-peak voltage for each of a plurality of squarewave signals to be added together in a combining unit. Each programmable-frequency squarewave generator is implemented as a digitally programmable counter-timer chip. The combining unit is comprised of a set of controllable switches, which are electrically operated to modulate the amplitude of the digitally-controllable output voltage provided by the DAC, in accordance with a composite (audio range) AC signal waveform defined by the programmable combination of one or more outputs of the signal waveform generators.

The output of the combining unit is coupled to a programmable lowpass filter stage comprised of a cascaded connection of a switched capacitor filter and a smoothing filter. The switched capacitor filter filters this signal, so as to form a prescribed sine wave or tone by removing odd harmonics from the fundamental frequency (or frequencies) of the desired waveform. The smoothing filter adjusts the cut-off frequency to remove the 'stairstep' clock noise transitions in the waveform associated with the operation of the switched capacitor filter and DC offset voltage. The buffered output of this lowpass filter stage can be coupled to an output amplifier which amplifies the signal, or it can be coupled through a programmable output circuit to tip/ring portions of the line. For generating DC voltages, the DAC output is directly coupled to the output amplifier. As with the DAC and signal waveform generators, operational parameters of the switched capacitor filter, adjustable smoothing filter, and output amplifier are digitally programmable.

For testing or conditioning the line, the microprocessor-controlled voltage source arrangement of the present invention applies a selectable DC or AC voltage to either the tip line portion of the telephone line individually, the ring line portion of the line individually, or differentially across the tip and ring portions of the line.

To test the line, the analog values of measured parameters are digitized and applied to the micro-controller. For this purpose, the arrangement includes an analog-to-digital converter (ADC) having an input coupled from the telephone line. The ADC provides a digital signal representative of the voltage present on the telephone line. Also included is a comparator circuit, which can be coupled to the input of the ADC and receives its DC threshold voltage from the output of the DAC. The comparator output indicates whether the input of the ADC exceeds the output of the DAC. If so, the micro-controller responds by changing the sensitivity range of the ADC.

DETAILED DESCRIPTION

Figure 1:
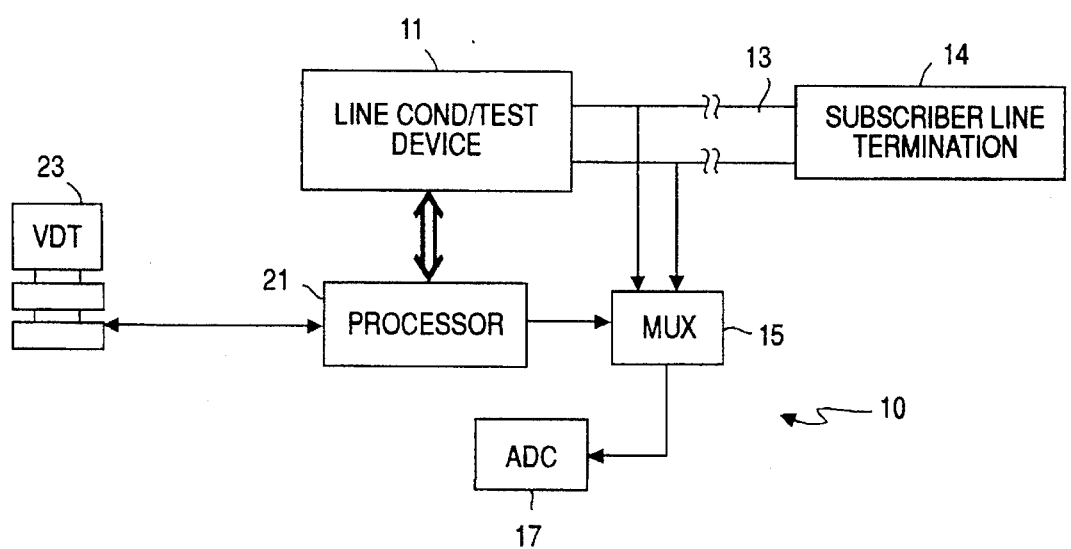
FIG. 1 diagrammatically illustrates the general architecture of a telephone line test apparatus.

Before describing in detail the microprocessor-controlled voltage source in accordance with the present invention, it should be observed that the present invention resides primarily in a novel structural combination of conventional signal processing and digital communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a block diagram of microprocessor-based telephone line test apparatus 10, with which the present invention may be employed is diagrammatically illustrated as comprising a line servicing unit 11, which may include the functionality of a metallic access unit, remote monitor unit, or both, and which is controllably accesses a telephone line 13, and applies prescribed line conditioning stimuli or transmit selected tone and communication signals over the line, as directed by telephone system servicing personnel.

For purposes of reducing the complexity of the drawing, FIG. 1 shows telephone line 13 as being terminated by a single subscriber line device 14 via a standard tip (T) and ring (R) pair. To monitor conditions on the line, the tip and ring portions of the line are selectively coupled through a multiplexer 15 to an analog-to-digital converter (ADC) 17, which sends digitized information to a control processor 21, which in turn controls the operation of the monitor and test equipment. The test unit is typically interfaced with an attendant workstation, shown at 23, through which service personnel may supervise the conditioning and measurements of the line under test (LUT) 13.

As described briefly above, conventional telephone line measurement and test apparatus contain a substantial number and variety of discrete conditioning and signal generation components, tone generation circuits, and electrical conditioning sources that are used to selectively apply prescribed test/tone signals to the line (such as DTMF tones, a 577.5 Hz tracer tone, and a 30 Hz line capacitance measurement sine wave) and to condition the line with a set of electrical circuit parameters (e.g. predetermined DC voltage levels). This allows a line monitoring unit to conduct line resistance and capacitance measurements and thereby determine the current state of the line and its ability to successfully perform as intended.

Pursuant to the present invention, in lieu of configuring the line servicing unit with a large number of single-function discrete signal generation and line conditioning components, we have instead provided a microprocessor-controlled voltage source that selectively applies to the telephone line either a DC or an AC voltage, prescribed waveform and frequency characteristics of which are programmably adjustable, thereby enabling the test equipment to controllably condition and test the line with essentially any desired line conditioning voltage or signal waveform.

Figure 2:
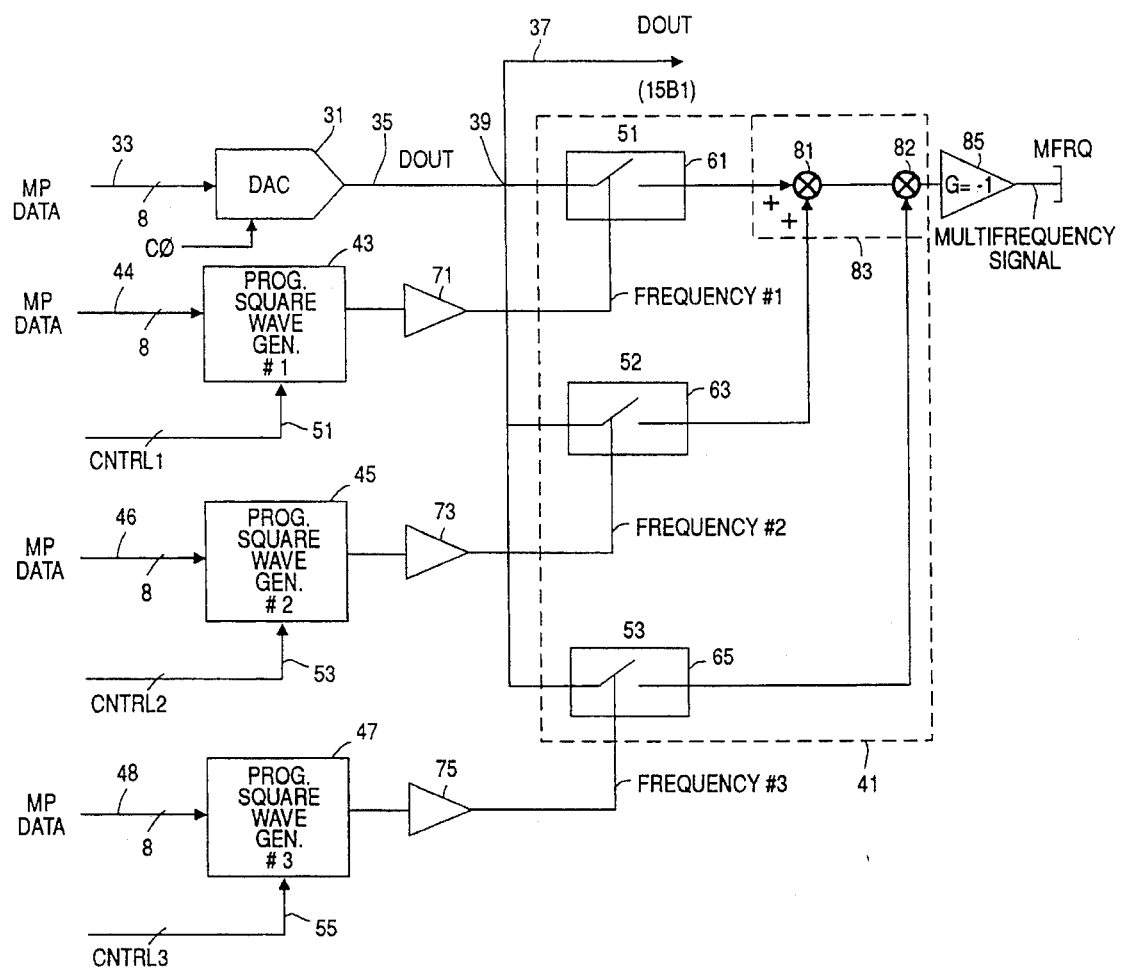
FIGS. 2–4, taken together, diagrammatically illustrate a microprocessor-controlled voltage source in accordance with the present invention.
Figure 3:
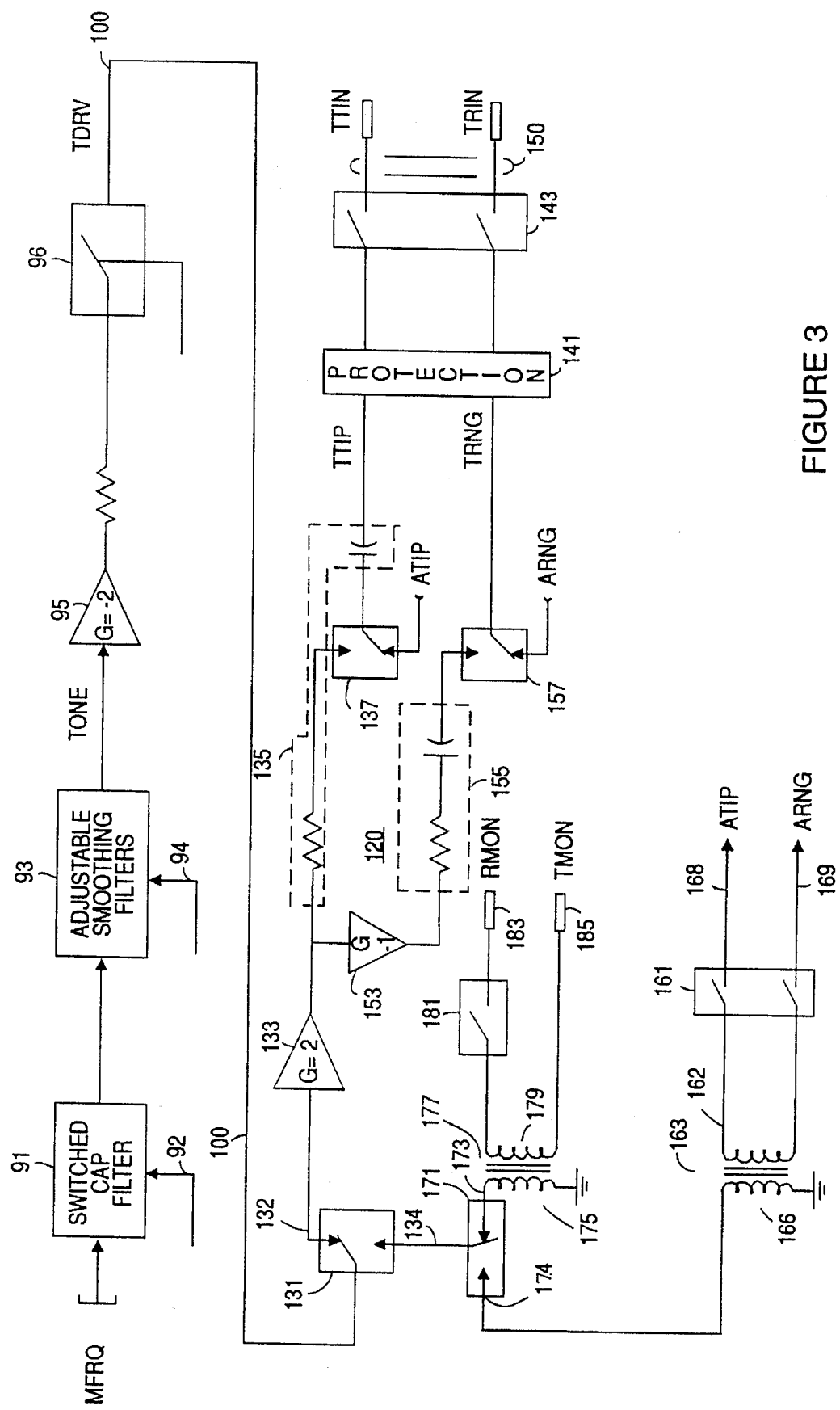
Figure 4:
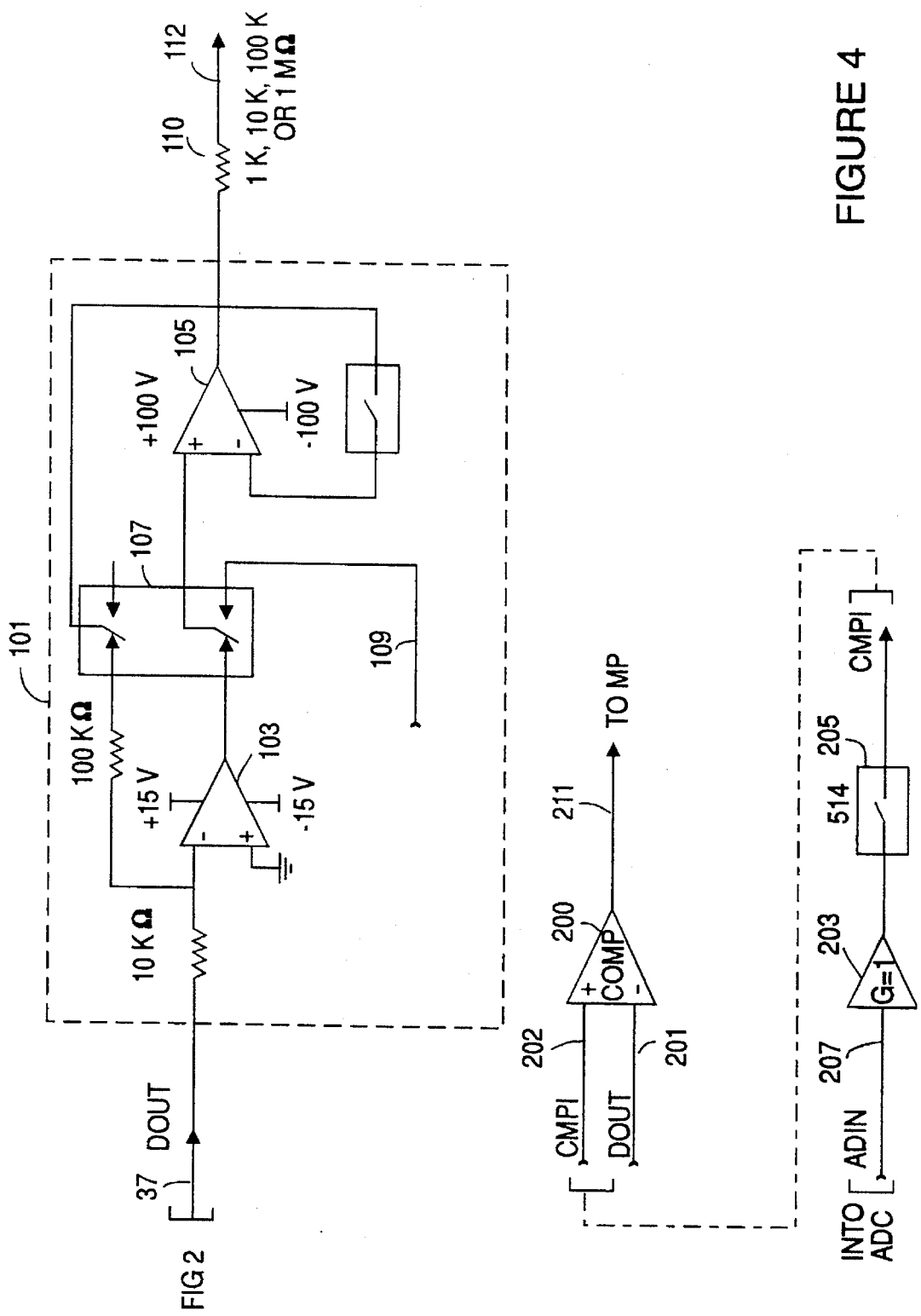

The microprocessor-controlled voltage source in accordance with the present invention is diagrammatically illustrated in FIGS. 2–4, taken together, as comprising a programmable digital-to-analog converter (DAC) 31 which produces an output voltage having an amplitude that is digitally selectable by means of an N-bit control code supplied from micro-controller 21 on digital input link 33. The output of the DAC 31, on line 35, is an adjustable DC voltage which is available to be applied to the telephone line through controlled amplifier circuitry provided in AC signal path 39, as will be described.

For purposes of a practical, but non-limiting application to present day telephone circuits and signal processing components, DAC 31 may have a voltage range of 0 to +10 volts and a digital input code resolution of eight to twelve bits. (Negative voltages are achieved by coupling the output of the DAC 31 through an inverter that provides a 0 to −10 volt range.)

In order to generate an AC voltage waveform that has both an adjustable amplitude and waveform characteristic, the output of the DAC 31 sets the amplitude for a plurality of signals from square wave generator, three (as a non-limiting number) of which are shown at 43, 45, and 47. Each squarewave generator has programmable frequency characteristics, and is implemented as a programmable timer/counter chip, which is driven by a prescribed clock signal (not shown) and functions to count down and roll over from a code value that has been preloaded via digital input links 44, 46 and 48. The data provided from these digital links sets the desired frequency of each output square wave, so that transitions in the square wave are dependent upon the programmable count value as supplied by the microcontroller Each square wave generator is enabled via a respective control input link shown at 51, 53, 55.

The combining unit 41 is comprised of a set of switches 61, 63, 65 which controllably interrupt the output voltage provided by the DAC 31 on link 39, in accordance with a programmed selection of one or more outputs of the signal waveform generators. Switches 61, 63 and 65 are automatically opened and closed by the square wave outputs of generators 43, 45 and 47, as supplied through respective buffer amplifiers 71, 73 and 75.

Combining unit 41 contains a cascaded adder unit 83, comprising adders 81 and 82, cascade-coupled in the signal flow path 39. The adders 81 and 82 sum the interrupted DAC outputs supplied by switches 61, 63 and 65 into a composite AC signal waveform. This composite waveform is coupled through a unity gain inverting amplifier stage 85 and applied to a switched capacitor filter 91, shown in FIG. 3. The cutoff points of switched capacitor filter 91 are programmable so that odd harmonics may be excised from the fundamental frequency of the composite waveform.

The output of switched capacitor filter 91 is applied to an adjustable smoothing filter stage 93 which removes or 'smooths out' 'stairstep' transitions in the waveform associated with the operation of the switched capacitor filter and takes out the DC component. As with the DAC and signal waveform generators, operational parameters of each of the switched capacitor filter 91 and adjustable smoothing filter 93 are digitally programmable, via respective control links 92 and 94. The output of the smoothing filter 93 is coupled via an inverting amplifier stage through a coupling resistor 95 and microcontroller-driven switch 96 to a (multifrequency) tone drive output port 100. As will be described, tone drive output port 100 provides an AC tone signal that can be selectively applied single-sided or differentially to the tip/ring portions of the telephone line of interest. The AC tone signal may also be applied to a high performance output amplifier stage 101, shown in FIG. 4, that can be employed for capacitance and resistance measurements. For DC voltage sourcing, the output of DAC 31 on DC path 37 can be supplied directly to output amplifier stage 101.

Output amplifier stage 101 comprises a first discrete operational amplifier stage 103 and a second discrete high performance amplifier 105 that is selectively fed through a switch 107 (under microprocessor control via link 109) so as to selectively establish the gain of the output amplifier stage (e.g., at unity gain or a gain of −10). The output of amplifier stage 101 is coupled through a set of source resistors, denoted by resistor stage 110, which are preselectable under microprocessor control to establish the source resistance of output port 112 (for example, when making resistance measurements).

For testing or conditioning a telephone line the arrangement of FIGS. 2–4 according to the present invention may further include a programmable output circuit, shown at 120 in FIG. 3, which selectively accommodates a plurality of functions, such as dialing DTMF digits, generating metallic test pair identification or 'tracer' tones (577.5 Hz), generating a fundamental audio sinewave (e.g. 30 Hz) for making capacitance measurements, generating different frequencies for conducting AC resistance measurements, and performing an audio band sweep of the lines. As will be described, programmable output circuit 120 applies the AC voltage waveform provided at tone drive output 100 either to the tip portion T of the telephone line individually, to the ring portion R of the line individually, or differentially across the tip T and ring R portions of the line.

For this purpose, as shown in FIG. 3, the output of switch 96 is coupled to a further microprocessor-driven switch 131, a first output 132 of which is coupled through an amplifier stage 133 and resistor-capacitor network 135 (which includes a tip side switch 137) to the tip T portion of a T/R test pair 150. A protection circuit 141 and coupling switch 143 are coupled in circuit with the T/R pair 150 as shown. The output of amplifier stage 133 is also coupled through an inverting amplifier stage 153 to a resistor-capacitor network 155, which is coupled through a ring side switch 157 to ring R portion of the T/R test pair 150. As a non-limiting example, the ring and tip portions of T/R test pair may be employed for callback and monitor functions for a metallic access unit with the subscriber circuit, whereby a tone is forwarded to a subscriber circuit through T/R test pair 150 and the subscriber voices back whether or not the tone is audible.

Each of the tip and ring side switches 137 and 157 is coupled to a respective ATIP and ARING terminal 168 and 169 at the output of a switch stage 161, the input of which is coupled to the secondary winding 162 of a transformer 163. Transformer 163 is employed to allow transformer couplng of the AC tone to tip and ring. Depending upon the settings of switches 137 and 157, the AC voltage (tone) at tone drive output port 100 will be selectively applied either single-ended to tip or ring, individually, or differentially (allowing a metallic tone to be driven across the tip/ring portions of the test tip and ring pair 150 of the telephone line of interest).

A second output 134 of switch 131 is coupled to a further microprocessor-driven switch 171, a first output 173 of which is coupled to the primary winding 175 of a second transformer 177. Transformer 177 has the ring line side of its secondary winding 179 coupled through a switch 181 to a ring monitor terminal 183 of a tip/ring monitor terminal pair 183, 185. A second output 174 of switch 171 is coupled to the primary winding 166 of transformer 163. Tip/ring monitor terminal pair 183 and 185 is employed for callback and monitor functions for a remote monitor voice path for the subscriber circuit, wherein, as described above for T/R test pair 150, a tone is forwarded to a subscriber circuit and the subscriber voices back on the monitor line whether or not the tone is audible.

As described above, when testing or monitoring the line, the analog values of monitored parameters of the telephone line 13 are digitized by ADC 17 and applied through MUX 15 to data input ports of micro-controller 21, as described above. In order to enable the sensitivity range of the ADC to be quickly established, the output of DAC 31 is coupled to a first input 201 of a comparator circuit 200 in FIG. 4. A second input 202 is coupled via a unity gain buffer amplifier 203 and a switch 205 from the input of the ADC on line 207. Comparator circuit 200 provides an output signal on line 211, which indicates whether the input of the ADC exceeds the output of the DAC. If so, the micro-controller 21 responds by immediately changing the sensitivity range of the ADC.

In summary, by the use of a microprocessor-controlled voltage source for selectively providing to a telephone line either a DC or an AC voltage (prescribed characteristics of which are programmably adjustable, thereby enabling test equipment to controllably condition and test the line with essentially any desired line conditioning voltage or signal waveform), the present invention effectively replaces the hardware-intensive architecture of conventional test and monitoring equipment that is customarily fitted with a large number of single-function circuits and discrete signal generation and line conditioning components, thereby providing a more versatile and less complex signal generator.

While we have shown and described a particular implementation of the present invention, it is to be understood that the same is not limited thereto, but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. A circuit arrangement for providing a controllable AC/DC voltage for application to a telephone line comprising:
    a programmable digital-to-analog converter which provides an output voltage having an amplitude that is digitally programmable;
    a plurality of signal waveform generators having programmable frequency and waveform characteristics; and
    a controlled combining unit which is coupled to said programmable digital-to-analog converter and said plurality of signal waveform generators, and uses the digital-to-analog output voltage to determine the peak-to-peak amplitude of one or more selected outputs of said plurality of signal waveform generators and combines them to produce an AC or DC voltage having programmably adjustable amplitude and frequency characteristics.

2. A circuit arrangement according to claim 1, wherein said controlled combining unit comprises a programmable switching unit which is coupled in circuit with an output of said programmable digital-to-analog converter and automatically interrupts the digital-to-analog output voltage in accordance with a programmable selection of said one or more outputs of said plurality of signal waveform generators.

3. A circuit arrangement according to claim 2, wherein said controlled combining unit further includes a switched capacitor filter coupled to filter said controllably interrupted, digitally controllable output voltage, an adjustable smoothing filter coupled to an output of said switch capacitor filter and an output amplifier which amplifies the output of said adjustable smoothing filter.

4. A circuit arrangement according to claim 3, wherein operational parameters of each of said switched capacitor filter, said adjustable smoothing filter, and said output amplifier are digitally programmable.

5. A circuit arrangement according to claim 1, wherein said telephone line includes respective tip and ring line portions, and wherein said circuit arrangement further comprises a programmable output circuit which selectively applies a controllable AC voltage provided by said controlled combining unit to either said tip line portion individually, to said ring line portion individually, or across said tip and ring line portions differentially.

6. A circuit arrangement according to claim 1, wherein said telephone line includes respective tip and ring line portions, and wherein said circuit arrangement further comprises a programmable output circuit which selectively applies either a controllable DC or AC voltage provided by said controlled combining unit to either said tip line portion individually, to said ring line portion individually, or across said tip and ring line portions differentially.

7. A circuit arrangement according to claim 1, further including an analog-to-digital converter having an input coupled to said telephone line and providing a digital signal representative of a monitored voltage of said telephone line, and further including a comparator circuit which is controllably coupled to the input of said analog-to-digital converter and to the output of said digital-to-analog converter and provides an output signal indicative of a prescribed relationship between the input of said analog-to-digital converter and the output of said digital-to-analog converter, with said analog-to-digital converter having its sensitivity range adjustable in accordance with said output signal.

8. For use with a telephone line servicing apparatus, a circuit arrangement for providing a controllable AC/DC voltage for application to a telephone line comprising:
 a programmable digital-to-analog converter which provides an output voltage having an amplitude that is digitally programmable in accordance with a digital code supplied thereto;
 a plurality of squarewave generators each having a programmable frequency;
 a programmable switching unit which is coupled to said programmable digital-to-analog converter and said plurality of squarewave generators, and controllably combines the outputs of said plurality of squarewave generators and modulates the voltage output of said programmable digital-to-analog converter with controllably combined outputs of said plurality of squarewave generators resulting in an AC voltage having programmably adjustable amplitude and frequency characteristics.

9. A circuit arrangement according to claim 8, wherein said programmable switching unit controllably interrupts the digitally-controllable output voltage provided by said digital-to-analog converter in accordance with a programmable selection of said one or more outputs of said plurality of squarewave generators.

10. A circuit arrangement according to claim 8, further including a switched capacitor filter coupled to filter said controllably interrupted digitally controllable output voltage, an adjustable smoothing filter coupled to an output of said switch capacitor filter and an output amplifier which amplifies the output of said adjustable smoothing filter.

11. A circuit arrangement according to claim 10, wherein operational parameters of each of said switched capacitor filter, said adjustable smoothing filter, and said output amplifier are digitally programmable.

12. A circuit arrangement according to claim 8, wherein said telephone line includes respective tip and ring line portions, and wherein said circuit arrangement further comprises a programmable output circuit which selectively applies an AC voltage signal provided by said programmable switching unit to either said tip line portion individually, to said ring line portion individually, or across said tip and ring line portions differentially.

13. A circuit arrangement according to claim 8, further including an analog-to-digital converter having an input coupled to said telephone line and providing a digital signal representative of a monitored voltage of said telephone line, and further including a comparator circuit which is controllably coupled to the input of said analog-to-digital converter and to the output of said digital-to-analog converter and provides an output signal indicative of a prescribed relationship between the input of said analog-to-digital converter and the output of said digital-to-analog converter, said analog-to-digital converter having its sensitivity range adjustable in accordance with said output signal.

\* \* \* \* \*